United States Patent [19]

Smith et al.

[11] Patent Number: 4,640,361

[45] Date of Patent: Feb. 3, 1987

[54] THERMALLY RESPONSIVE AQUEOUS SILICATE MIXTURES AND USE THEREOF

[75] Inventors: William H. Smith, Walters; Edward F. Vinson, Duncan, both of Okla.

[73] Assignee: Halliburton Company, Duncan, Okla.

[21] Appl. No.: 808,576

[22] Filed: Dec. 13, 1985

[51] Int. Cl.$^4$ .......................................... E21B 33/138
[52] U.S. Cl. ................................. 166/288; 106/38.23; 106/80; 166/292; 166/300
[58] Field of Search .................. 166/292, 288, 300; 405/266; 106/80, 900, 38.23

[56] References Cited

U.S. PATENT DOCUMENTS

| | | | |
|---|---|---|---|
| 2,078,836 | 4/1937 | Carter | 106/80 |
| 3,202,214 | 8/1965 | McLaughlin et al. | 166/292 |
| 3,244,230 | 4/1966 | Sharp | 166/292 |
| 3,435,899 | 4/1969 | McLaughlin et al. | 166/292 |
| 3,645,336 | 2/1972 | Young et al. | 166/288 |
| 3,741,307 | 6/1973 | Sandiford et al. | 166/292 X |
| 4,070,196 | 1/1978 | Kraak et al. | 106/80 X |
| 4,140,183 | 2/1979 | Holm | 166/292 X |
| 4,257,483 | 3/1981 | Morris et al. | 166/292 |
| 4,293,440 | 10/1981 | Elphingstone et al. | 166/288 X |
| 4,341,559 | 7/1982 | Friedemann et al. | 106/38.35 |
| 4,384,894 | 5/1983 | Vickers et al. | 106/80 |
| 4,391,642 | 7/1983 | Stevenson et al. | 106/38.23 |

*Primary Examiner*—George A. Suchfield
*Attorney, Agent, or Firm*—Edward F. Sherer

[57] ABSTRACT

A thermally responsive aqueous silicate composition consisting essentially of an aqueous solution containing an alkali metal silicate and a thermally responsive silicate gelation activator. The thermally responsive silicate gelation activator is a reducing sugar selected from the group consisting of lactose, dextrose, fructose, galactose, mannose, maltose, xylose and mixtures thereof. The aqueous silicate composition can be utilized in treating a subterranean formation for the purpose of sealing the formation.

20 Claims, No Drawings

THERMALLY RESPONSIVE AQUEOUS SILICATE MIXTURES AND USE THEREOF

BACKGROUND OF THE INVENTION

I. Field of the Invention.

This invention relates to compositions and to methods for controlling the gelation time of aqueous silicate-containing compositions and further relates to methods wherein said aqueous silicate-containing compositions are utilized in treating a subterranean formation.

II. Description of the Prior Art.

In the production or treatment for the purposes of improving production of fluids from a permeable subterranean formation, it is often helpful and sometimes necessary to lessen the permeability of portions or zones of the formation. This entails sealing or plugging certain interstitial spaces, channels, fissures, and the like in order to seal off, plug, or otherwise obstruct openings providing fluid passageways in the permeable formation penetrated by a well bore.

Aqueous silicate solutions which are gelled or solidified with acid producing activators have been known and used in many applications including sealing and consolidation processes carried out in subterranean formations. A number of water-soluble silicates and processes using such silicates are disclosed in U.S. Pat. Nos. 3,202,214 and 3,435,899 which are assigned to the assignee of the present invention and are hereby incorporated by reference.

Sodium silicate is a complicated system of various molecular weight silica polymers in an alkaline solution. Aside from requiring a certain minimum amount of alkalinity, sodium silicate has no definite chemical combining numbers. When sodium silicate is acidified to a pH less than about 10 or 11, the sodium silicate is converted partially to silicic acid. Silicic acid exists at these alkaline pH's as a weak acid. Instead of precipitating and producing silica, $SiO_2$, the silicic acid remains hydrated and forms a three-dimensional network entrapping the solvent water. This network is a gel since both phases are continuous. A slight lowering of the pH brings about radical changes in gel time. Consequently, gel times are difficult to control, and lumping from local acid concentrations during large scale mixing frequently occurs.

Sodium silicate may be caused to form a gel which will seal an underground formation or plug capillaries therein by the addition of polyvalent cations such as $Ca^{++}$, $Fe^{+++}$, $Cr^{+++}$, $Cu^{++}$, etc. However, the addition of the polyvalent cations described above utilizing salts containing the cations may cause immediate gelation of the sodium silicate which allows no time to pump the solution into the formation.

U.S. Pat. No. 3,202,214 discloses a method of gelling an aqueous silicate composition utilizing a reducing agent and an oxidizing agent. Although method dissolved therein is useful in many application, the use of oxidizing and reducing agents to gel an aqueous sodium silicate-containing composition results in increased expenses and the gel produced therefrom undergoes syneresis and is thus not totally satisfactory for use in treating a subterranean formation. Furthermore, the gels formed by the use of an oxidizing agent and reducing agent are not particularly effective in treating subterranean formations having temperatures between 120° F. and 170° F.

The present invention provides a method of gelling aqueous silicate compositions through the use of thermally responsive gelation activators which overcomes or at least mitigates the above described problems.

SUMMARY OF THE INVENTION

By the present invention, thermally responsive silicate gelation activators are utilized which can be mixed with an aqueous silicate solution as part or all of the required acid producing activator; yet, the composition containing the activator has a reduced gel rate until the temperature of the mixture is raised to a given level, which is at least 120° F. The use of such thermally responsive aqueous silicate compositions makes it possible to apply or place the compositions in particular applications with little or no risk of premature gelation. Furthermore, the aqueous silicate-containing compositions of this invention can be prepared in advance and stored for relatively long periods of time, such as 24 hours, before use.

DETAILED DESCRIPTION OF THE INVENTION

Silicates which can be used for the compositions and methods of this invention are water-soluble silicates which form silicate polymer chains or gel upon acidification. The preferred silicates are those of alkali metals, especially sodium, potassium and mixtures thereof. These silicates are commerically available as dry powders or concentrated aqueous solutions having from about 31 to about 55 parts solid per 100 parts of solution and a pH of in the range of from about 10 to about 13.5 (hereinafter referred to as "concentrated aqueous silicate"). The concentrated aqueous silicate and the aqueous silicate mixtures of the present invention including the temperature responsive activators described hereinafter preferably have a pH greater than about 9, most preferably in the range of from about 10 to about 13 at temperature levels below the activation temperature period. Upon activation and the production of acid or acid equivalents by the activator, the pH of the aqueous silicate mixture is decreased to a pH below about 9 and the mixture gels or sets. The delay and long shelf life referred to herein is the time period following mixing of a temperature responsive activator of the present invention with an aqueous silicate solution and ending with the beginning of gelation and does not refer to the actual gelation period.

Preferably, the water-soluble silicates, that are employed in the present invention have a molar ratio of silicon dioxide to alkali metal oxide in the range of from about 0.5 to 1 to about 3.5 to 1 and the alkali metal is sodium, potassium, and mixtures thereof. The preparation of these silicates is well known in the art and is disclosed in U.S. Pat. No. 4,525,285, which is assigned to the assignee of the present invention and is hereby incorporated by reference.

The thermally responsive gelation activators of the present invention can generally be described as reducing sugars. Examples of suitable reducing sugars include lactose, dextrose, fructose, galactose, mannose, maltose, and xylose. The preferred reducing sugar for use in the present invention is lactose.

In general, the reducing sugars may be incorporated into the aqueous silicate solutions either as an anhydrous solid or as an aqueous solution, both of which forms are commerically available. Generally, from about 10 to about 300 percent by weight of reducing sugar based on the amount of silicate present in the aqueous silicate solution may be employed in gelation of the aqueous silicate solution. It will be appreciated, however, that the amounts of reducing sugar utilized will vary widely depending on the formation to be treated and the desired gelling rate.

In addition to the aqueous silicate solutions which contain the silicate and reducing sugar, a reactive salt capable of reacting with the alkali metal silicate may be included therein. For example, when a reactive salt is employed in the aqueous silicate solutions which contain the silicate and reducing sugar, the amount of reducing sugar employed is reduced and the gelling rate of the silicate solutions is increased which results in improved economics in carrying out the present invention. Preferably, a reactive salt is not utilized in formations having a temperature greater than 120° F. The term "reactive salt" is intended to mean those Group I - Group II metal salts which chemically react with the aqueous silicate to produce a completely or substantially water-insoluble gel. Specific reactive salts include calcium chloride, magnesium chloride, potassium chloride, sodium chloride, and mixtures thereof. The preferred reactive salt is calcium chloride. When a reactive salt is utilized in the aqueous silicate solutions, it is generally incorporated into the aqueous silicate solution in an amount to produce a concentration of salt in the range of from about 0.5 g/liter to about 5 g/liter of solution. Of course, the amount of reactive salt employed should be insufficient to immediately form a satisfactory gel if used alone with the silicate. Care should be taken not to use highly excessive amounts of reactive salts of polyvalent metals since such reactive salts can readily form insoluble complexes with the silicate which then will precipitate from the system.

The compositions of the invention will incorporate sufficient water to render them fluid. Generally, at least a portion of the necessary water will be supplied by using a commercial aqueous silicate solution, as described above, with additional water being supplied, if desired, or by the admixture of water and reducing sugar and/or by any reactive salt solution when employed.

It will be appreciated that amounts of thermally responsive silicate gelation activator, added water, and, when utilized, reactive salt used in proportion to the silicate, as well as the quantity utilized in treating a subterranean formation, varies widely depending on the temperature, porosity, permeability and other factors of the formation. Accordingly, it generally is not feasible to define, in terms of proportions, a silicate composition which represents an optimum material for all types of formations or the quantity utilized in treating the formation.

However, effective aqueous silicate solutions of the present invention generally comprise, from about 3 to about 55 percent, preferably about 6 to about 36 percent, by weight of an aqueous alkali metal silicate having an alkali metal oxide to silicon dioxide weight ratio in the range of from about 0.5 to 1 to about 3.5 to 1 and the alkali metal is preferably sodium or potassium; about 1.5 to about 25 percent by weight reducing sugar; and the balance of the aqueous silicate solution being added water (water in addition to that separately admixed with alkali metal silicate, reducing sugar and, optionally, reactive salt). No water need be added or it may be present in an amount of 0.5 to about 16 times the volume of the aqueous commercial silicate used.

Upon the disassociation of the gelation activators, acid groups or acid equivalent groups are produced which react with the aqueous silicate solution to lower the pH thereof and cause the gelation or polymerization thereof. That is, when the pH of the aqueous silicate solution is lowered by the activator to a value within the range of from about 7 to about 12.2, the gelation phenomenon takes place. This, in effect, reduces the pH of the concentrated aqueous silicate solution below the range of from about 10 to about 13, which is required for a stable aqueous silicate mixture.

The aqueous silicate solutions are activated at temperatures in the range of from about 120° F. to about 170° F. At temperatures below 120° F., the activators produce aqueous silicate-activator mixtures with good shelf life and low risk of premature gelation.

The temperature of the thermally activated aqueous silicate compositions of the present invention can be raised to a level causing the gelation of the compositions using a variety of methods. In a grouting process, the aqueous silicate composition can be mixed with the activator, applied to a substrate which is to be grouted, and the mixtures can be heated to cause the activator to react and gel the silicate composition. The heating of the silicate composition can be accomplished using radiant light heat or heat created by other techniques such an electromagnetic field.

In carrying out subterranean well formation treatments in accordance with this invention, preferably, an aqueous silicate solution and an aqueous solution containing the reducing sugars are mixed together. The reducing sugar brings about gelation of the solution at the temperature level to which the mixture is heated in the formation, i.e., a temperature from about 120° F. to about 170° F. Upon being introduced into the formation, the formation heat causes the temperature of the silicate composition to rise to the level necessary for the activator to react and gel the silicate. If the formation temperature is well above the activator reaction temperature, it may be desirable to cool formation prior to the application or injection of the silicate mixtures to delay gelation or insure against premature gelation.

With highly concentrated silicate mixtures, contamination by salts, acid, etc., must be carefully avoided and the mixtures should be carefully and uniformly mixed with the activator and any optional materials, such as reactive salts. For most applications, the activator is preferably added to and mixed with the silicate solution as dry material. The concentrated aqueous silicate is also typically diluted to reduce the viscosity for easier application and pumping.

As will be understood by those skilled in the art, the particular advantages of the present invention resides in the ability to provide a predictable delay in the gelling reaction of the aqueous silicate composition-containing the gelation activator. In addition, the gelation activator is a one component system consisting essentially of a reducing sugar and thus does not require the addition of additional components, such as oxidizers and the like.

The following examples will serve to more comprehensively illustrate the principles of the invention, but are not intended to limit the bounds of the invention.

EXAMPLE I

Samples of aqueous silicate compositions containing the gelation initiator were prepared. The solutions had a total volume of 100 ml and contained 16 percent by volume of a concentrated aqueous sodium silicate, which is described as Grade 40 in the SODIUM SILICATE HANDBOOK and contains about 38 parts solids per 100 parts concentrate with a ratio of 3.22 moles of $SiO_2$ per mole of $Na_2O$ and a pH of about 13, various amounts of lactose, and sufficient water to produce a total volume of 100 ml.

Samples of the silicate solutions were placed in a constantly stirred heat bath and maintained at various temperatures. The gel time of the aqueous silicate solutions was then measured. The results of these tests are shown in Table I.

TABLE I

| Test No. | Lactose Conc. g/100 ml | Temperature (°F.) | Gel Time (minute) |
|---|---|---|---|
| 1. | 1.98 | 170 | 185 |
| 2. | 2.64 | 170 | 122 |
| 3. | 3.96 | 170 | 77 |
| 4. | 5.28 | 170 | 55 |
| 5. | 1.98 | 160 | 275 |
| 6. | 2.64 | 160 | 189 |
| 7. | 3.96 | 160 | 109 |
| 8. | 5.28 | 160 | 76 |
| 9. | 6.60 | 160 | 53 |
| 10. | 2.64 | 150 | 370 |
| 11. | 3.96 | 150 | 212 |
| 12. | 5.28 | 150 | 154 |
| 13. | 6.60 | 150 | 116 |
| 14. | 7.93 | 150 | 94 |
| 15. | 9.25 | 150 | 78 |
| 16. | 3.96 | 140 | 448 |
| 17. | 5.28 | 140 | 312 |
| 18. | 6.60 | 140 | 240 |
| 19. | 7.93 | 140 | 195 |
| 20. | 9.25 | 140 | 170 |
| 21. | 10.57 | 140 | 152 |
| 22. | 11.89 | 140 | 137 |
| 23. | 7.93 | 130 | 380 |
| 24. | 9.25 | 130 | 330 |
| 25. | 10.57 | 130 | 275 |
| 26. | 11.89 | 120 | 440 |

EXAMPLE II

A series of tests were carried out by preparing a 50 ml aqueous silicate solution comprising 16 ml of concentrated aqueous silicate, (Grade 40), 7.2 grams of lactose, and tap water. A second 50 ml solution was prepared which contained various amounts of $CaCl_2$. The second solution was added to the first solution with rapid stirring. The combined mixtures were placed in a constantly heated water bath at various temperatures. The gel time was then measured. The results of these tests are shown in Table II.

TABLE II

| Test No. | $CaCl_2$ Conc. g/100 ml | Temperature (°F.) | Gel Time (minute) |
|---|---|---|---|
| 1. | 0.12 | 120 | 372 |
| 2. | 0.18 | 120 | 281 |
| 3. | 0.24 | 120 | 172 |
| 4. | 0.30 | 120 | 127 |
| 5. | 0.12 | 130 | 245 |
| 6. | 0.18 | 130 | 190 |
| 7. | 0.24 | 130 | 118 |
| 8. | 0.30 | 130 | 87 |
| 9. | 0.12 | 140 | 137 |
| 10. | 0.18 | 140 | 106 |
| 11. | 0.24 | 140 | 82 |
| 12. | 0.30 | 140 | 59 |
| 13. | 0.12 | 150 | 103 |
| 14. | 0.18 | 150 | 79 |
| 15. | 0.24 | 150 | 60 |
| 16. | 0.30 | 120 | 46 |

The invention is not limited to the above-described specific embodiments thereof; it must be understood therefore, that the detail involved in the descriptions of these embodiments is presented for the purposes of illustration only, and that reasonable variations and modifications, which will be apparent to those skilled in the art, can be made of this invention without departing from the spirit and scope thereof.

What is claimed is:

1. A method of plugging or sealing a zone in a subterranean formation comprising:
    (a) contacting said zone with an aqueous silicate composition consisting essentially of
        (i) an aqueous solution containing an alkali metal silicate; and,
        (ii) a thermally responsive gelation activator selected from the group consisting of lactose, dextrose, fructose, galactose, mannose, mantose, xylose and mixtures thereof; and
    (b) activating said gelation activator in response to a thermal change in said composition within said formation whereby said silicate composition is caused to form a gel in said zone.

2. The method recited in claim 1 wherein said formation has a temperature in the range of from about 120° F. to about 170° F.

3. The method recited in claim 2 wherein said alkali metal silicate has a molar ratio of silicon dioxide to alkali metal oxide in the range of from about 0.5 to 1 to about 3.5 to 1.

4. The method recited in claim 3 wherein said alkali metal is selected from the group consisting of sodium, potassium, and mixtures thereof.

5. The method recited in claim 4 wherein said thermally responsive gelation activator is lactose.

6. The method recited in claim 5 wherein said thermally responsive gelation activator is present in said composition in an amount in the range of from about 10 to about 300 percent by weight of the alkali metal silicate.

7. The method recited in claim 6 wherein said composition further comprises a reactive salt capable of reacting with the alkali metal silicate.

8. The method recited in claim 6 wherein said alkali metal silicate has a ratio of about 3.22 moles of $SiO_2$ per mole of $Na_2O$.

9. The method recited in claim 8 wherein said alkali metal silicate is present in said composition is an amount in the range of from aboug 3 to about 55 percent by weight of the composition.

10. A method of treating a subterranean formation having a temperature in the range of from about 120° F. to about 170° F. to obstruct an opening therein comprising:
    placing in said opening a composition consisting essentially of
        (a) an aqueous solution containing an alkali metal silicate; and
        (b) a thermally responsive gelation activator selected from the group consisting of lactose, dextrose, fructose, galactose, mannose, maltose, xylose and mixtures thereof and
    activating said gelation activator in response to a thermal change in said composition whereby said composition is caused to form a gel in said opening.

11. The method recited in claim 10 wherein said alkali metal silicate has a molar ratio of silicon dioxide to alkali metal oxide in the range of from about 0.5 to 1 to about 3.5 to 1 and said alkali metal is selected from the group consisting of sodium, potassium, and mixtures thereof.

12. The method recited in claim 11 wherein said thermally responsive gelation activator is lactose and said activator is present in said composition in an amount in the range of from about 10 to about 300 percent by weight of the alkali metal silicate.

13. A method of forming a solidified silicate from an aqueous silicate solution comprising admixing an aqueous solution containing an alkali metal silicate and a thermally responsive gelation activator selected from the group consisting of lactose, dextrose, fructose, galactose, mannose, maltose, xylose and mixtures thereof and activating said gelation activator by effecting a thermal change in said aqueous silicate solution whereby a solidified silicate is formed.

14. The method recited in claim 13 wherein said alkali metal silicate has a molar ratio of silicon dioxide to alkali metal oxide in the range of from about 0.5 to 1 to about 3.5 to 1.

15. The method recited in claim 13 wherein said alkali metal is selected from the group consisting of sodium, potassium, and mixtures thereof.

16. The method recited in claim 13 wherein said thermally responsive gelation activator is lactose.

17. The method recited in claim 13 wherein said thermally responsive gelation activator is present in said composition in an amount in the range of from about 10 to about 300 percent by weight of the alkali metal silicate.

18. The method recited in claim 13 wherein said composition further comprises a reactive salt capable of reacting with the alkali metal silicate.

19. The method recited in claim 13 wherein said alkali metal silicate has a ratio of about 3.22 moles of $SiO_2$ per mole of $Na_2O$.

20. The method recited in claim 13 wherein said alkali metal silicate is present in said composition is an amount in the range of from about 3 to about 55 percent by weight of the composition.

* * * * *

UNITED STATES PATENT AND TRADEMARK OFFICE
CERTIFICATE OF CORRECTION

PATENT NO. : 4,640,361

DATED : February 3, 1987

INVENTOR(S) : William H. Smith and Edward F. Vinson

It is certified that error appears in the above-identified patent and that said Letters Patent is hereby corrected as shown below:

In Column 1, line 58, following "Although" insert --the--.

In Column 1, line 58 and 59, delete the word "dissolved" and insert therefor --disclosed--.

Signed and Sealed this

Tenth Day of November, 1987

Attest:

DONALD J. QUIGG

Attesting Officer

Commissioner of Patents and Trademarks